United States Patent [19]

Germain et al.

[11] Patent Number: 4,848,073
[45] Date of Patent: Jul. 18, 1989

[54] LAWN RAKE

[75] Inventors: Robert A. Germain, Harrisburg, Pa.; William E. Portz, Anderson, S.C.

[73] Assignee: Emhart Industries, Inc., Farmington, Conn.

[21] Appl. No.: 211,145

[22] Filed: Jun. 22, 1988

Related U.S. Application Data

[63] Continuation of Ser. No. 868,471, May 30, 1986, abandoned.

[51] Int. Cl.⁴ .............................................. A01D 7/00
[52] U.S. Cl. .................................. 56/400.17; 56/400; 56/400.21
[58] Field of Search ........... 56/400.16, 400.17, 400.18, 56/400.21, 400.01, 400

[56] References Cited

U.S. PATENT DOCUMENTS

| 1,837,677 | 12/1931 | Rocquin | 56/400.17 |
| 1,959,893 | 5/1934 | Bailie | 56/400.17 |
| 4,215,528 | 8/1980 | Fodor | 56/400.17 |

Primary Examiner—John Weiss
Assistant Examiner—J. Hakomaki
Attorney, Agent, or Firm—Barry E. Deutsch

[57] ABSTRACT

A lawn rake includes a tine receiving rake head molded of a plastic material as an integral unit structure and includes a handle receiving portion and at least one tine mounting portion. The handle receiving portion includes a generally centrally located elongated socket portion for receiving therein one end of a handle. The socket portion includes a circumferential groove formed in the wall defining the socket. The groove has a solid wall portion and a slotted wall portion. A spring-like member has a first end connected to the rake head adjacent the tine mounting portion and a second end terminating in partially annular portion. The partially annular portion is adapted to pass through the slotted portion of the groove to be seated within the solid wall portion thereof. A handle is inserted into the socket portion of the rake head for securing the partially annular portion of the spring in the groove.

6 Claims, 2 Drawing Sheets

LAWN RAKE

This is a continuation of co-pending application Ser. No. 868,471 filed on May 30, 1986, now abandoned.

BACKGROUND OF THE INVENTION

This invention relates to lawn rakes and more specifically to lawn rakes having a tine receiving rake head molded of a plastic material.

Molded plastic heads have been known in the art as exemplified by U.S. Pat. Nos. 3,707,835; 3,724,188; and 4,215,528. Molded plastic heads are desirable for lawn rake constructions because they are economical and durable in nature.

Plastic head lawn rakes generally include a spring member which extends from the upper end of the head towards the handle portion thereof. The spring member provides rigidity to and support for the plastic head of the lawn rake. Heretofore, the spring has been secured at its end adjacent the handle of the rake by clamps or other similar locking devices. Such locking devices increase the cost of manufacturing the lawn rake without increasing the rake's value. In fact, since the screws or similar devices securing the clamps about the spring tend to work free in normal use of the rake, such prior art securing methods for the spring have not always been entirely satisfactory from a performance standpoint. Further, the clamps or similar locking devices are relatively tiny parts and are sometimes lost by the rake user when assembling the rake.

Accordingly, it is an object of the invention to reduce the cost of manufacture of a plastic head lawn rake. It is still a further object of the invention to positively lock the spring to the handle receiving portion of the head without utilizing clamps or similar locking devices.

SUMMARY OF THE INVENTION

These and other objects of the present invention are attained in a lawn rake comprising a tine receiving rake head molded of a plastic material as a integral unit structure having a handle receiving portion and at least one tine mounting portion molded integrally as a single structure, the handle receiving portion including a centrally located elongated socket portion for receiving therein one end of a handle, said socket portion including a circumferential groove formed in the wall defining the socket and having a solid wall portion and a slotted portion, a spring member having a first end connected to the rake head adjacent said tine mounting portion and a second end terminating in a generally partially annular portion adapted to pass through the slotted portion of the groove to be seated within the solid wall portion thereof; and a handle inserted within the socket portion of the rake head for securing the partially annular portion of said spring in said groove.

DESCRIPTION OF THE PERFERRED EMBODIMENT

Figure 1:
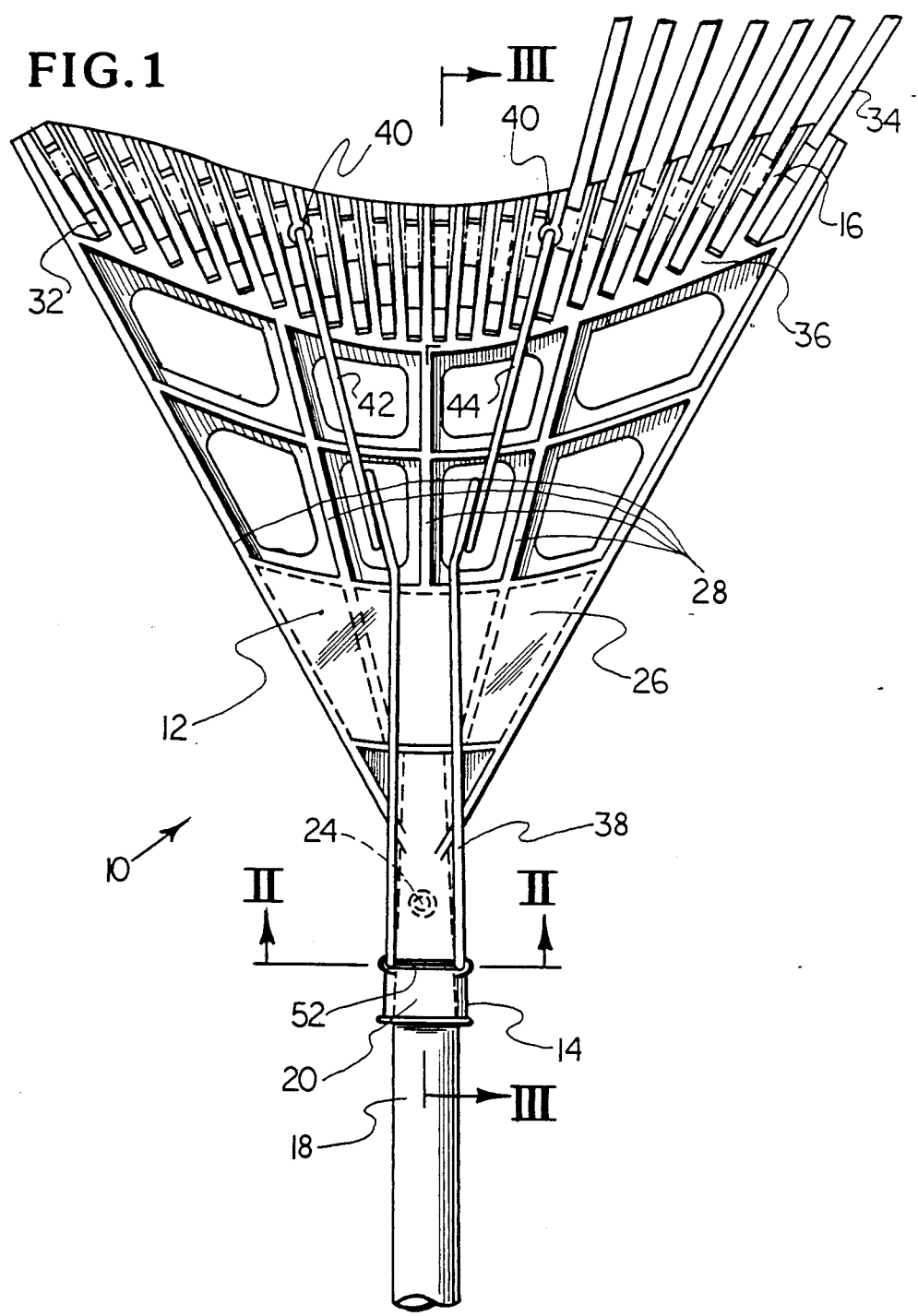
FIG. 1 is a top plan view of a lawn rake embodying the preferred embodiment of the present invention.

Referring now to the drawing, there is shown a lawn rake generally including at 10 indicating the features of the invention in a preferred embodiment. Head 12 of rake 10 is molded as a single unitary structure of a suitable plastic material such as polypropolene or the like. In the illustrated embodiment, rake head 12 is illustrated as being of a conventional broom-shaped configuration, although it should be understood that head 12 could assume a so-called radial form or other similar conventional shapes.

Rake head 12 is made up of a handle engaging portion 14 and a tine mounting portion 16 combined in a single integrally molded unitary structure.

Handle engaging portion 14 is designed to provide a convenient means for receiving and securing handle 18 during assembly and is of rigid construction suited to withstand the usual forces applied thereto by the user. A centrally located, elongated, longitudinally extending socket portion 20 in handle portion 14 is tapered inwardly and shaped to conform to the end of handle 18 which is likewise tapered and is inserted into the socket portion. The handle is maintained in place within socket portion 20 by the locking action of the taper and, additionally, by suitable locking means such as a screw 22 which is inserted through hole 24 and then into the secured end of handle 18.

Handle engaging portion 14 of head 12 is intentionally formed to be substantially more rigid and therefore more resistive to being flexed than is tine mounting portion 16. A transversed, substantially rectangular web 26 is located forwardly of handle portion 14 and is connected thereto. Ribs 28 radiate from a lower edge of web 26 and also extend along the sides thereof as illustrated in FIG. 1. Web 26 provides rigidity to the upper portion of head 12. Ribs 28 are tapered in the direction of tine mounting portion 16 so that a more flexible character is imparted to the tine mounting portion towards the ground engaging end of rake head 12.

The tine mounting portion includes, a concave tine holder section 30 molded integral with ribs 28. Tine holder section 30 is provided with tine receiving pockets 32 molded therein to receive a plurality of tines 34. Pockets 32 are spaced from each other and connected together by intervening web portion 36. The pockets are relatively thick as compared to the thickness of intervening web portion 36 to provide rigidity in the immediate area in which the respective tines 34 are secured in place. As the means for securing the tines in place does not form any part of the invention, and there are several conventional means for securing the tines, the specific means will not be described. Suffice it is to say that such means generally allows the tines to be readily removable from any of the pockets by a simple manual operation. Tines 34 are preferably stamped from any suitable metal or are formed from plastic, fiberglass or the like.

Rake 10 further includes a generally U-shaped spring 38. The U-shaped spring includes elongated sides 42, 44 connected together at one end by a partially annular portion 46. Tine holder section 30 has pockets 40 molded therein for receiving the free ends of elongated sides 42, 44.

Socket 20 has a circumferential groove 48 formed in the wall defining the socket. Groove 48 has a solid wall portion 50 and a slotted portion 52.

Spring 38 is provided to increase the overall rigidity and strength of the lawn rake. In essence, the spring acts as a suspension system for the rake head. Heretofore, it has been the common practice to clamp or otherwise secure the spring to the rake handle. The prior art methods of securing the spring have not always performed satisfactorily and in addition, have increased the manufacturing cost of the rake without adding to the rake's value.

Figure 2:
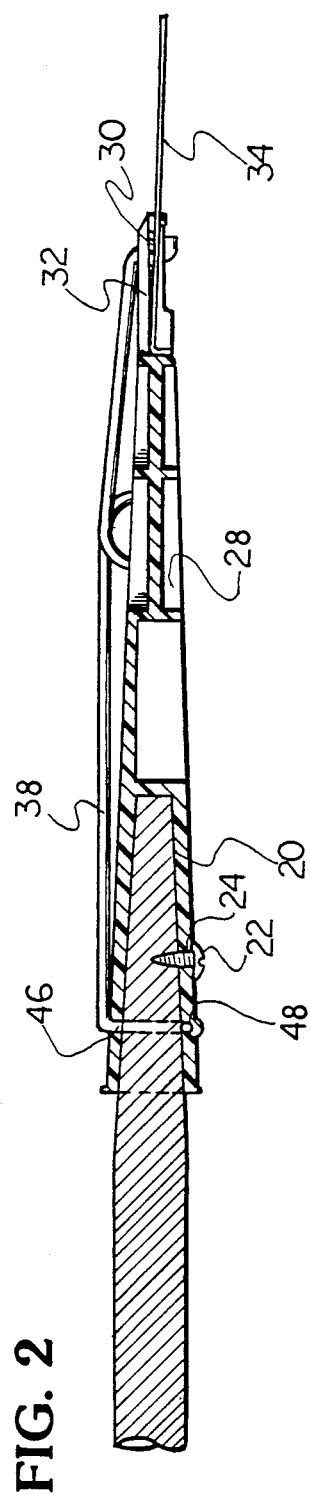
FIG. 2 is a sectional view taken along line II—II of FIG. 1.
Figure 3:
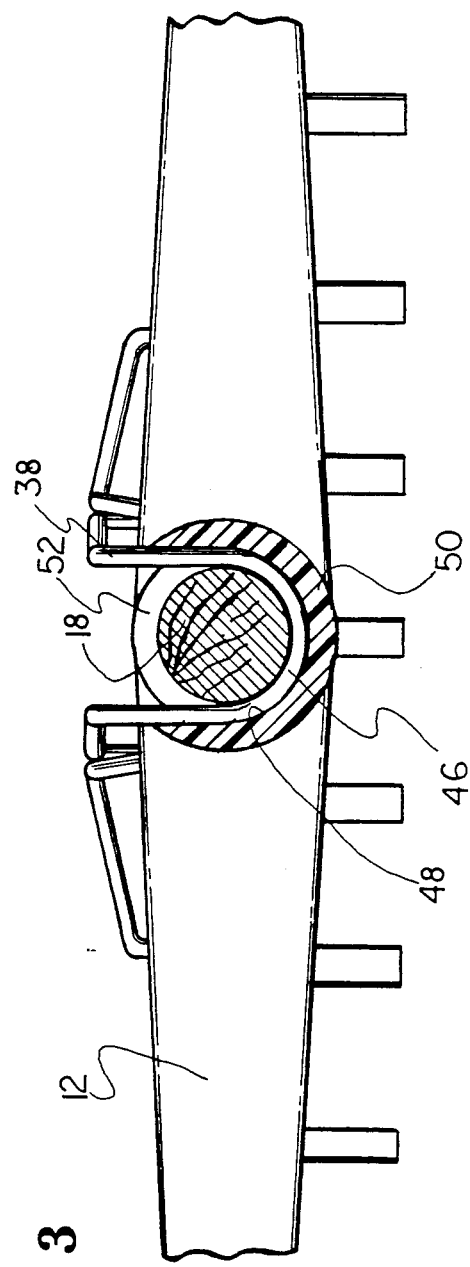
FIG. 3 is a sectional view of the rake taken along line III—III of FIG. 1.

The present invention overcomes the prior art defects. In particular, the partially annular portion 46 of the spring 38 is adapted to pass through slotted portion 52 of groove 48 to be seated within the solid wall portion 50 of the groove. This arrangement is particularly illustrated in FIG. 2 of the drawing. Once the partially annular portion 46 of the spring is seated in the solid wall portion 50 of groove 48, handle 18 is inserted into socket portion 20 of head 12. With the end of the handle thus inserted into the socket, the partially annular end 46 of the spring is firmly secured in place within groove 48 of socket 20. The spring cannot be displaced from this position unless and until handle 18 is removed from socket 20. The present invention eliminates the utilization of fasteners which tend to vibrate loose during normal operation of the rake. In effect, the present invention utilizes the handle of the rake to lock the spring in its position within socket 20, with the partially annular portion 46 seated in solid wall 50 of groove 48.

While a preferred embodiment of the present invention has been described and illustrated, the invention should not be limited thereto but may be otherwise embodied within the scope of the following claims.

We claim:

1. A lawn rake comprising:

a tine receiving rake head molded of a plastic material as an integral unit structure having a handle receiving portion and at least one tine mounting portion molded integrally as a single structure, said handle receiving portion including a generally centrally located elongated socket portion for receiving therein one end of a handle and including a circumferential groove formed in the wall defining said socket, said groove having a solid wall portion and a slotted portion;

a spring member having a first end connected to said rake head adjacent said tine mounting portion and a second end terminating in a generally partially annular portion adapted to pass through the slotted portion of said groove to be seated within the solid wall portion thereof; and a handle inserted into the socket portion of said rake head for securing the partially annular portion of said spring-member in said groove.

2. A lawn rake in accordance with claim 1 wherein said spring is generally U-shaped, with the two elongated side of said U being connected to said rake head, and the connecting bottom portion of said U including the partially annular portion.

3. A lawn rake in accordance with claim 2 wherein the rake head has a pair of transversely spaced pockets for receiving the ends of said elongated sides of said spring-member to form in combination with the groove in said socket wall a three point suspension system.

4. A lawn rake comprising:

a tine receiving rake head molded of a plastic material as an integral unit structure having a handle receiving portion and at least one tine mounting portion molded integrally as a single structure, said handle receiving portion including a generally centrally located elongated socket portion for receiving therein one end of a handle and having a generally flange-like surface defining an open end of the socket;

a spring member having a first end connected to said rake head adjacent said tine mounting portion and a second end terminating in a generally partially annular portion to form a passageway; and a handle inserted through said passageway into the socket portion of said rake head for securing the partially annular portion of said spring member relative to said socket portion of said rake head.

5. A lawn rake in accordance with claim 4 wherein said spring is generally U-shaped, with the two elongated sides of said U being connected to said rake head, and the connecting bottom portion of said U including the partially annular portion.

6. A lawn rake in accordance with claim 5 wherein the rake head has a pair of transversely spaced pockets for receiving the ends of said elongated sides of said spring member to form in combination with the flange-like surface of said socket portion a three point suspension system.

* * * * *